Nov. 13, 1956     J. T. SERDUKE     2,770,590
REACTOR CIRCULATING SYSTEM
Filed May 17, 1950     2 Sheets-Sheet 1

WITNESSES:

INVENTOR:
James T. Serduke

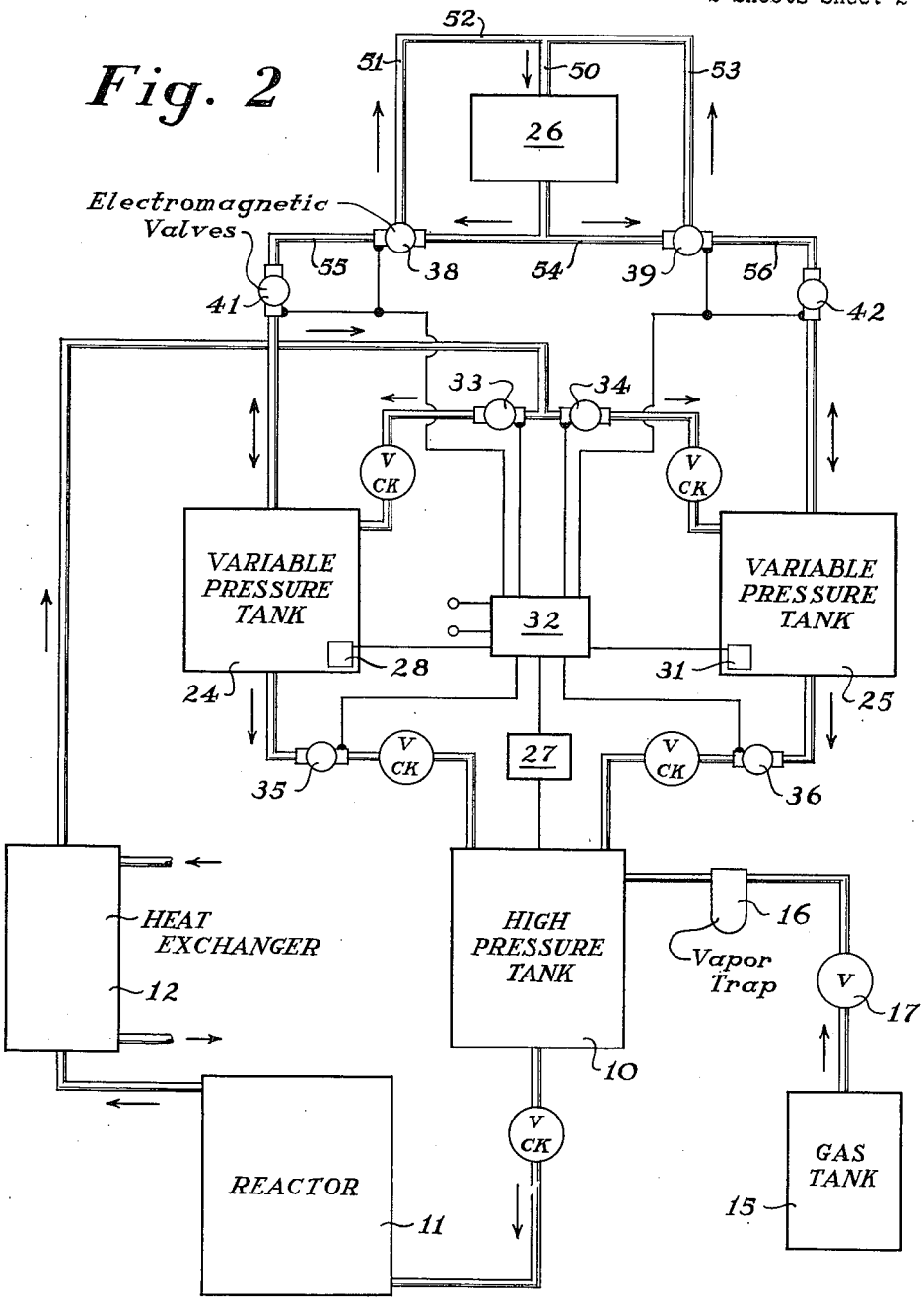

United States Patent Office 2,770,590
Patented Nov. 13, 1956

2,770,590

REACTOR CIRCULATING SYSTEM

James T. Serduke, El Cerrito, Calif., assignor to the United States of America as represented by the United States Atomic Energy Commission Application May 17, 1950, Serial No. 162,553

1 Claim. (Cl. 204—193)

This invention relates to a fluid circulating system and more particularly to a coolant circulating system for fast neutron reactors.

In the operation of fast neutron reactors it is necessary for reasons of safety to provide means for quickly removing the generated heat from the reaction area. A means for speedily removing heat from the reactor is of further interest with respect to the possible commercial utilization of the heat. However, in the selection of a suitable heat transfer means, due consideration must be given to the problems arising from the unavoidable exposure of the coolant to the neutron flux of the reactor, to plutonium, if that element is exposed, and to the highly radioactive fission products.

A convenient means for transferring heat rapidly from a reactor is to circulate a heat transfer liquid or coolant through the reaction area. The heated liquid may be passed through a cooling means and recycled through the reactor, or may be discarded. If the heat is to be used commercially the heated liquid can be passed through a heat exchanger for further transfer of heat by a suitable medium to a place of utilization. However, there are certain difficulties connected with circulating a heat transfer liquid or coolant through a system which includes a neutron reactor. Chief among these is leakage from the system of material, such as gases, which are or have become radioactive. The main source of this leakage in prior heat exchange systems for fast neutron reactors has been through the pumps used to circulate the heat transfer liquid. Mechanical pumps have been used almost exclusively in the past for driving the liquid through the system and leakage of contaminated material through shaft connections, worn packing glands and other elements has been concomitant with their use.

It is therefore an object of this invention to provide an improved coolant circulating system for fast neutron reactors.

It is another object of this invention to provide for fast neutron reactors a coolant circulating system which is secure against the escape of contaminated material.

The apparatus of the invention through which the above objects are accomplished comprises as its principal elements a heat exchanger adapted to receive and cool a heated coolant coming from the reactor, receiving means such as tanks for receiving coolant at low pressures from the heat exchanger and a second receiving means for receiving coolant under high pressures from the low pressure receiving means and delivering it back to the reactor, all of the elements being connected in circuit with the reactor by a continuous conduit system. Coolant is forced through the system in one embodiment by hermetically sealed electromagnetic pumps in the conduit system and in a second embodiment by an inert gas under pressure.

The use of the hermetically sealed electromagnetic pumps eliminates the possibility of escape of contaminated vapors such as coolant vapors; the hazards arising from the contamination of gases used to drive coolant through the system is eliminated by the use of an inert gas. In each embodiment the power supply used to force coolant through the system is controlled by the rate of flow of the coolant, suitably by means of the level of liquid in the high pressure receiving means. The level of liquid in the high pressure receiving means is in turn related to the pressure on a head of inert gas which is maintained above the coolant in the high pressure receiving means.

It is well known that the rate of flow through a given system determines the pressure drop therethrough, and conversely, if a given pressure is maintained at the inlet end, a certain rate of flow will obtain at the outlet end. One convenient method of achieving a given pressure is to confine a given amount of gas in a given volume. If the gas is confined above a liquid, then the level of the liquid, by defining the volume of the gas thereby defines the pressure on the liquid. The pressure applied to the liquid determines its rate of flow in the system. It may readily be seen that rate of flow may be controlled in this invention by controlling the level of the liquid confining the gas cushion.

The invention can best be understood by reference to the accompanying drawings hereby made a part of this specification.

Figure 2 is a block diagram of a modification of the heat transfer system.

Figure 1:
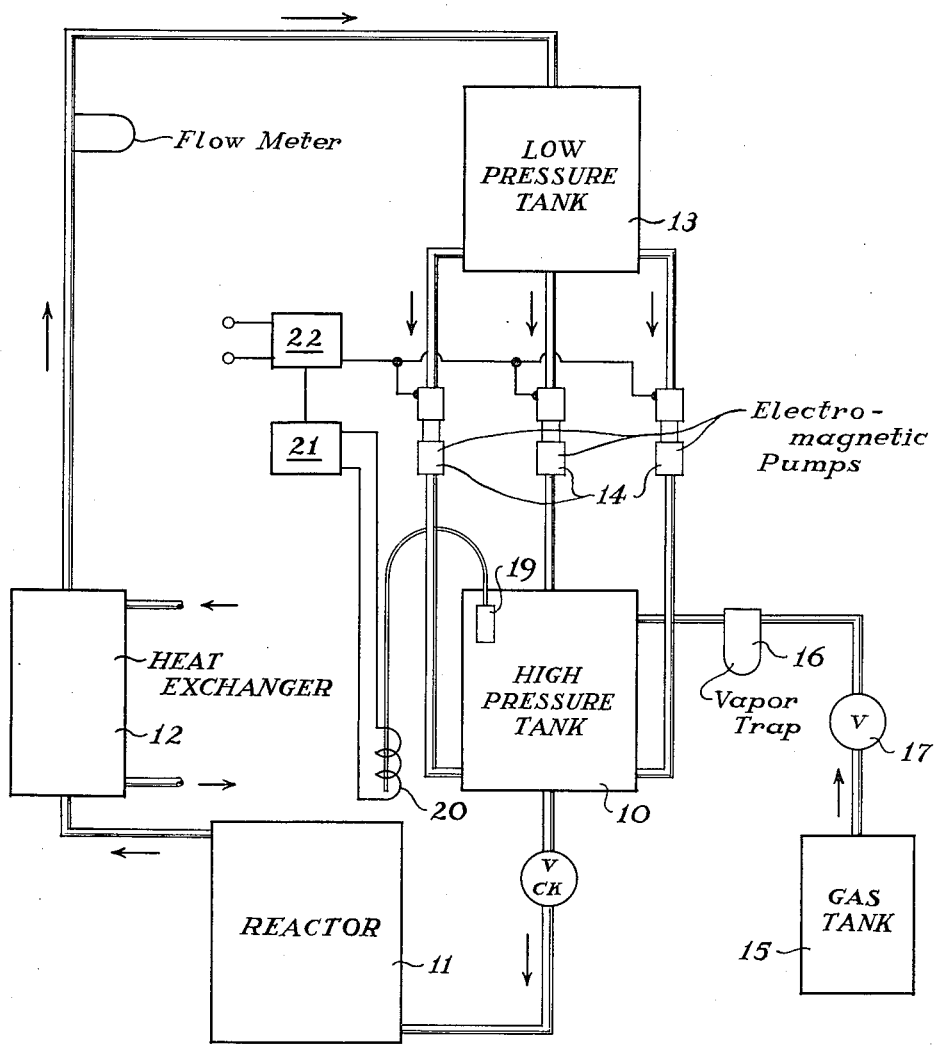
Figure 1 is a block diagram of the heat transfer system of the invention.

Referring to Figure 1, high pressure tank 10 for receiving coolant at high pressures, reactor 11 (of the type described in detail in co-pending application by Richard P. Feynman, Serial No. 43,993, filed August 13, 1948, for reactors and of the type described in detail in the co-pending application of Fermi, et al., Serial No. 568,904, filed December 19, 1944, now Patent No. 2,708,656, dated May 17, 1955, which are hereby incorporated by reference into this disclosure), heat exchanger 12 and low pressure tank 13 for receiving coolant at low pressures are connected by conduits through which a heat transfer liquid or coolant, such as mercury, is kept in continuous circulation by the electromagnetic pumps 14 between the low and high pressure tanks. Suitable inlet and outlet valves are provided in the conduits between the low and high pressure tanks. A pressure head of inert gas which serves as a cushion is provided above the heat transfer liquid in the high pressure tank 10, by means of a communicating gas storage tank 15 supplied with a vapor trap 16 and a pressure regulator valve 17. The level of the liquid in tank 10 regulates the operation of the electromagnetic pumps 14 and thus the rate of flow of heat transfer liquid or coolant through the system. The regulation is effected by means of float 19, inductance unit 20, oscillator 21 and electronic switch 22. The frequency of the oscillator 21 is varied by the float responsive inductance 20 and interpreted by the electronic switch 22 to energize the pumps 14 at the proper time and control their speed of operation. Although the above is a preferred arrangement for controlling the operation of the electromagnetic pumps 14 other arrangements may obviously be used. The pumps used are hermetically sealed, electromagnetic pumps of the general type disclosed in Patent No. 2,061,869 to J. W. Gilbert et al. Their use rather than the use of the mechanical type pump ordinarily employed in the past eliminates the chief source of contamination escape common to prior heat exchange systems for neutronic reactors.

In the operation of the circulating system, gas pressure is applied to create a pressure head above the liquid in tank 10 and start it through the system. The electromagnetic pumps operating in response to the action of the float in tank 10 maintain a continuous flow of liquid through the system, the gas above the liquid in tank 10 acting as a cushion. As the speed of operation of the pumps 14 is controlled by the variable inductance 20 which in turn is varied by the movement of the float 19 the rate of flow of liquid through the system can be controlled by adjusting the volume of gas above the liquid in tank 10 to lower or raise pressure on the liquid in the tank. The above arrangement can be seen to furnish a heat exchange system which is secure against the escape of contaminated material and a system in which the rate of flow of heat transfer liquid can be readily controlled.

Another embodiment of this invention is illustrated in Figure 2 in which the heat transfer fluid is circulated by gas pressure through a liquid carrying duct passing through reactor 11 and heat exchanger 12. The arrangement of high pressure tank 10, reactor 11, heat exchanger 12, gas tank 15, vapor trap 16 and valve 17 are substantially the same as used in the embodiment of Figure 1. In this embodiment, however, the fluid from the heat exchanger 12 passes through fluid duct means and is received by two variable pressure tanks 24 and 25, and is returned through outlet ducts to tank 10, tanks 24 and 25 being operated in parallel: while variable pressure tank 24 is maintained at low pressure to receive heat transfer fluid from exchanger 12, the other variable pressure tank 25 is raised to high pressure by means of gas pressure applied from source 26 and the fluid within this tank is transferred to high pressure tank 10 and through the system under the control of liquid level actuated device 27. A sufficient amount of heat transfer fluid is provided so that when one variable pressure tank is nearly empty the other is nearly filled with fluid.

One system for operation of the above apparatus is the following. Liquid level actuated elements 28 and 31 are situated near the bottom of tanks 24 and 25, respectively. These devices control the position of a four-pole two-position gang switch 32. When, for example, the falling level of heat transfer fluid in nearly empty tank 24 causes element 28 to change the position of gang switch 32 electromagnetic valve 33 is opened and electromagnetic valve 34 is closed; valve 35 is closed and valve 36 is opened. Heat transfer fluid can then flow from heat exchanger 12 through a fluid duct into empty tank 24, and can also be forced from filled tank 25 through an outlet duct into tank 10 by means of gas pressure supplied from gas source 26 under control of liquid level actuated device 27. Gas pressure source 26 is a unidirectional force flow means which causes flow downward in cross-connecting duct 50, and is connected by duct 50 into a rectangular system of gas collecting ducts 51 through 53, including upper duct 52. The gas collecting ducts 51 and 53 are connected to upper duct 52 and through one position of the electromagnetically controlled two-way valves 38 and 39 to gas ducts 55 and 56, respectively. The second positoin of the electromagnetic valves connects gas ducts 55 and 56 to lower duct 54. In this position of gang switch 32, valve 38 is positioned to allow gas to be removed from tank 24 through gas duct 55 by gas source 26 and valve 39 is positioned to allow gas to flow from the outlet side of gas source 26 through gas duct 56 into tank 25. Valve 41 is held open and valve 42 is electrically connected to liquid level actuated element 27 so that the liquid level in tank 10 controls the application of high pressure gas to tank 25 to force heat transfer fluid into tank 10 and thence through the system.

Suitable techniques for insuring satisfactory operation are employed. For example, a very brief time delay in the opening of valves 33 and 36 is provided so that gas pressure conditions are established in tanks 24 and 25 such that the heat transfer fluid will flow into tank 24 and out of tank 25 when valves 33 and 36 are presently opened.

Check valves are provided on the heat transfer fluid lines, suitably on the line leading to reactor 11 and on the lines on which valves 33 through 36 are situated. Valves 41 and 42 are of the normally open type; valves 33 through 36 are of the normally closed type. Valves 38 and 39 are of the two position type: connection may be made through either of valves 38 and 39 to either the intake or the output side of gas source 26. The gas source 26 is capable of exhausting gas from either tank and of supplying gas to the other tank under a pressure slightly above that required for circulation of the heat transfer fluid at the desired rate.

When tank 24 has been filled, tank 25 will have been emptied and control element 31 then changes the position of gang switch 32 so as to reverse the positions of all valves and connections so that the flow of heat transfer fluid continues substantially without interruption.

Helium is used in connection with the system as this gas is inert to neutrons. Other inert gases may conceivably be used.

Mercury is used as the heat transfer liquid as it possesses most of the qualities required of a good heat exchange liquid, with respect to heat conductivity, melting point and absorption cross section for fast neutrons. The invention, however, is not limited to the use of mercury as other heat transfer liquids may conceivably be used.

The heat exchange means used may be a heat exchanger of suitable conventional type. In principle, heated mercury or other coolant is admitted to the exchanger from the reactor where the heat is transferred to a suitable heat exchange liquid such as water and the cooled mercury recirculated through the system.

It is an advantage of the invention that it provides a coolant circulating system for fast neutron reactors which eliminates the possibility of escape of contaminated material from the system. It is another advantage of the invention that it provides an efficient means for maintaining the flow of heat transfer liquid through a circulating system at a predetermined rate of flow.

As many apparently widely different embodiments of the invention may be made without departing from the spirit and scope thereof, it is to be understood that the invention is not limited to the specific embodiments thereof except as defined in the appended claim.

What is claimed is:

A reactor coolant circulating system for a nuclear reactor wherein the reactor is connected to a heat exchanger by a liquid-carrying duct passing through the reactor and the heat exchanger, the combination with the reactor and heat exchanger of a high pressure coolant tank duct-connected to said liquid carrying duct at the reactor end thereof; first and second variable pressure liquid coolant tanks; a first and second outlet duct each duct including an electromagnetically-controlled flow valve, said outlet ducts connecting said first and second variable pressure tanks to said high pressure coolant tank; duct means, containing electromagnetically-controlled flow valve means, connecting said first and second variable pressure tanks to said liquid-carrying duct at the heat exchanger end, a gas pressure duct network containing a unidirectional gas pressure source having a gas inlet and outlet, a first and second electromagnetically-controlled two position valve, said gas source inlet being connected through one position of said first and second electromagnetically-controlled valves to a first and second gas duct, said first and second gas duct connected respectively to said first and second variable pressure tanks; a gas collecting duct connected between the second positions of said first and second electromagnetically-controlled valves and said gas pressure source inlet; a liquid level control located in each of said variable pressure tanks, electrical switch means controlled by said level controls for controlling the relative positions of said electromagnetically-controlled flow valve, said electromagnetic-controlled flow valve means and said first and second electromagnetically-controlled two position valves, whereby the low pressure side and the high pressure side of said gas pressure source are respectively connected to a depleted variable pressure tank and to a filled variable pressure tank.

References Cited in the file of this patent

UNITED STATES PATENTS

| | | |
|---|---|---|
| 2,410,568 | Cohen | Nov. 5, 1946 |

FOREIGN PATENTS

| | | |
|---|---|---|
| 861,390 | France | Oct. 28, 1940 |
| 541,953 | Great Britain | Dec. 18, 1941 |
| 233,011 | Switzerland | June 30, 1944 |